(12) United States Patent
Carey

(10) Patent No.: US 9,206,043 B2
(45) Date of Patent: Dec. 8, 2015

(54) METHOD OF AND DEVICE FOR OPTIMIZING A HYDROGEN GENERATING SYSTEM

(71) Applicant: Marine Power Products Incorporated, Hayward, CA (US)

(72) Inventor: Jeffrey M. Carey, Hayward, CA (US)

(73) Assignee: Marine Power Products Incorporated, Hayward, CA (US)

( * ) Notice: Subject to any disclaimer, the term of this patent is extended or adjusted under 35 U.S.C. 154(b) by 0 days.

(21) Appl. No.: 13/904,774

(22) Filed: May 29, 2013

(65) Prior Publication Data
US 2013/0259798 A1    Oct. 3, 2013

Related U.S. Application Data

(63) Continuation-in-part of application No. 12/706,639, filed on Feb. 16, 2010, and a continuation-in-part of application No. 13/366,216, filed on Feb. 3, 2012.

(60) Provisional application No. 61/154,282, filed on Feb. 20, 2009, provisional application No. 61/653,972, filed on May 31, 2012.

(51) Int. Cl.
*C25B 1/04* (2006.01)
*C25B 15/02* (2006.01)
(Continued)

(52) U.S. Cl.
CPC . *C01B 3/068* (2013.01); *B01J 7/02* (2013.01); *B01J 19/087* (2013.01); *C01B 3/04* (2013.01); *C01B 13/0203* (2013.01); *C25B 1/04* (2013.01);
(Continued)

(58) Field of Classification Search
CPC .. C25B 1/02–1/12; C25B 15/02; C25B 15/08
USPC .......... 205/628–639, 746–747; 204/237–238
See application file for complete search history.

(56) References Cited

U.S. PATENT DOCUMENTS

| 4,004,067 A | 1/1977 | Briggs et al. |
| 4,144,147 A | 3/1979 | Jarrett et al. |

(Continued)

FOREIGN PATENT DOCUMENTS

| CN | 101160258 A | 4/2008 |
| EP | 1249052 B1 | 4/2009 |

(Continued)

OTHER PUBLICATIONS

Electroplating by Frederick Lowenheim, New York, 1979, p. 12-25.*
(Continued)

*Primary Examiner* — Nicholas A Smith
*Assistant Examiner* — Brian W Cohen
(74) *Attorney, Agent, or Firm* — Haverstock & Owens LLP

(57) ABSTRACT

A method of and apparatus for optimizing a hydrogen producing system is provided. The method of optimizing the hydrogen producing system comprises producing hydrogen gas using a hydrogen producing formulation and removing a chemical substance that reduces the hydrogen gas producing efficiency. Further, the hydrogen producing system comprises a hydrogen producing catalyst, a hydrogen generating voltage applied to the hydrogen producing catalyst to generate hydrogen gas, and a catalyst regenerating device to regenerate the hydrogen producing catalyst to a chemical state capable of generating the hydrogen gas when a hydrogen generating voltage is applied.

11 Claims, 7 Drawing Sheets

(51) Int. Cl.

| | |
|---|---|
| *C25B 15/08* | (2006.01) |
| *C25B 15/00* | (2006.01) |
| *C01B 3/06* | (2006.01) |
| *B01J 7/02* | (2006.01) |
| *C01B 3/04* | (2006.01) |
| *C01B 13/02* | (2006.01) |
| *B01J 19/08* | (2006.01) |
| *B01J 23/89* | (2006.01) |

(52) U.S. Cl.
 CPC ............... *C25B 15/02* (2013.01); *C25B 15/08* (2013.01); *B01J 23/8926* (2013.01); *B01J 2219/00006* (2013.01); *B01J 2219/00144* (2013.01); *Y02E 60/364* (2013.01)

(56) References Cited

U.S. PATENT DOCUMENTS

| | | | |
|---|---|---|---|
| 4,358,291 A | 11/1982 | Cuomo et al. | |
| 4,394,293 A | 7/1983 | Gratzel et al. | |
| 4,454,427 A | 6/1984 | Sosnowski et al. | |
| 5,219,671 A | 6/1993 | Parker et al. | |
| 5,796,799 A * | 8/1998 | Kobayashi et al. | 376/306 |
| 6,306,917 B1 | 10/2001 | Bohn et al. | |
| 6,843,903 B2 | 1/2005 | Roe et al. | |
| 7,125,480 B2 | 10/2006 | Austin | |
| 7,252,806 B1 | 8/2007 | Merritt | |
| 7,875,166 B2 | 1/2011 | Matthai et al. | |
| 7,989,507 B2 | 8/2011 | Rising | |
| 2001/0046113 A1 | 11/2001 | Schmidt | |
| 2002/0048548 A1 | 4/2002 | Chaklader | |
| 2004/0265678 A1 | 12/2004 | Hommura et al. | |
| 2005/0051439 A1 | 3/2005 | Jang | |
| 2006/0102468 A1 | 5/2006 | Monzyk et al. | |
| 2006/0118428 A1 | 6/2006 | Baltrucki et al. | |
| 2006/0180464 A1 | 8/2006 | Griffin | |
| 2006/0188436 A1 | 8/2006 | Griffin | |
| 2006/0249393 A1 * | 11/2006 | Ghosh et al. | 205/639 |
| 2007/0072949 A1 | 3/2007 | Ruud et al. | |
| 2007/0244208 A1 | 10/2007 | Shulenberger et al. | |
| 2009/0074611 A1 | 3/2009 | Monzyk et al. | |
| 2009/0101520 A1 | 4/2009 | Zhang et al. | |
| 2009/0110976 A1 | 4/2009 | Yoshida et al. | |
| 2009/0115190 A1 * | 5/2009 | Devine | 290/44 |
| 2009/0152126 A1 | 6/2009 | Griffin | |
| 2009/0277799 A1 | 11/2009 | Grimes | |
| 2010/0000874 A1 | 1/2010 | Hinman et al. | |
| 2010/0133111 A1 | 6/2010 | Nocera et al. | |
| 2010/0224502 A1 | 9/2010 | Carey | |
| 2011/0114075 A1 | 5/2011 | Mills | |
| 2013/0277231 A1 * | 10/2013 | Greenberg | 205/746 |

FOREIGN PATENT DOCUMENTS

| | | |
|---|---|---|
| WO | 8910981 | 11/1989 |
| WO | 2010084358 A2 | 7/2010 |
| WO | 2011002527 A1 | 1/2011 |
| WO | 2012062529 A1 | 5/2012 |

OTHER PUBLICATIONS

CRC Handbook of Chemistry and Physics 76th Edition, David Lide (editor), New York, 1995-1996, p. 8-58.*
Hydrogen Production-Wikepedia, the free encyclopedia, pp. 4-7, http://en.wikipedia.org/wiki/Hydrogen_production.
Venere,Emil, "New Process Generates Hydrogen From Aluminum Alloy to Run Engines, Fuel Cells", Purdue University, http://news.uns.purdue.edu/x/2007a/070515WoodallHydrogen.html, May 15, 2007.
Perret, Robert, "II.F.1 Develpment of Solar-Powered Thermochemical Production of Hydrogen from Water", DOE Hydrogen Program, FY 2007 Annual Progress Report, pp. 128-135.
Kim, MingJoong et al., "Hydrogen generation from hydrolysis reaction through corrosion of Al—Cu alloy in alkaline water", Dep. of Materail Science and Engineering.
"Bayer process", hhtp://en.wikipedia.org/wiki/Bayer_proces, pp. 1-2.
Soler, Lluis et al., "Aluminum and aluminum alloys as sources of hydrogen for fuel cell applications", Journal of Power Sources,2007, www.sciencedirect.com, www.elsevier.com/locate/jpowsour, pp. 144-149.
Currao et al., Water Splitting with Silver Chloride Photoanodes and Amorphous Silicon solar Cells. Photochemical and Photobiological Sciences, vol. 3, 2004, [retrieved on Nov. 19, 2013], Retrieved from the Internet. <URL: http://www.gioncalzaferri.ch/publikationen/Photochem_Photobiol_Sci_2004_3_1017%20Watersplitting.pdf>.entire document.
Peters, W.G., "Colloidal Silver Chemistry", http://www.wgpeters.com//colloidal-silver-chemistry//, pp. 1-3.

* cited by examiner

METHOD OF AND DEVICE FOR OPTIMIZING A HYDROGEN GENERATING SYSTEM

CROSS-REFERENCE TO RELATED APPLICATIONS

This application is a continuation-in-part of U.S. patent application Ser. No. 12/706,639, filed Feb. 16, 2010, and entitled "Method and Apparatus for Efficient On-demand Production of $H_2$ And $O_2$ From Water Using Waste Heat and Environmentally Safe Metals", which claims priority from U.S. Provisional Patent Application Ser. No. 61/154,282, filed Feb. 20, 2009 and entitled "Method and Apparatus for Efficient On-demand Production of $H_2$ And $O_2$ From Water Using Environmentally Safe Metals", which are all hereby incorporated herein by reference in their entirety for all purposes.

Further, this application claims priority from co-pending U.S. patent application Ser. No. 13/366,216, filed Feb. 3, 2012 and entitled "Stability Control of a Hydrogen Generating System and Method," which is hereby incorporated herein by reference in its entirety for all purposes.

Furthermore, this application claims priority from U.S. Provisional Patent Application Ser. No. 61/653,972, filed May 31, 2012 and entitled "Method of and Device for Optimizing a Hydrogen Generating System," which is hereby incorporated herein by reference in its entirety for all purposes.

FIELD OF THE INVENTION

The present invention relates to hydrogen production. More specifically, the present invention relates to the optimization of a hydrogen generating system.

BACKGROUND OF THE INVENTION

Hydrogen is commonly produced from hydrocarbon fossil fuels. One of the significant problems of using hydrocarbon fossil fuels to generate hydrogen is that the process generates carbon dioxide ($CO_2$), a greenhouse gas. An alternative source for hydrogen production is water. Currently available methods of generating hydrogen from water include biological hydrogen production, electrolysis of water, chemical production, and thermochemical production.

Some researchers report that Group IV transitional metals react with water and generate hydrogen gas and a metal hydroxide. However, no stable hydrogen production system exists that is able to produce hydrogen efficiently and economically in a steady manner and with a constant rate at low temperatures below 500° F.

SUMMARY OF THE INVENTION

Methods of and devices for optimizing the efficiency, stability, and continuity of hydrogen and/or oxygen production systems are disclosed. The factors that are used for the system optimization include catalyst optimization treatment at the preparation stage (Redox/pre-generation) of the catalysts, the selection of an optimal catalyst formulation, chloride ion (Cl−) optimization (removal) during the operational stage (generation) of the catalysts, sodium ion (Na+) removal, sediment removal, and filtration of the water used.

At the electrode (catalyst) preparation/optimization stage (pre-generation), the time for preparing and optimizing the electrodes for hydrogen production is able to be shortened by applying a pre-selected range of base voltage, pulse voltages, and/or incrementally increased voltages. In some embodiments, a base voltage of 150 mV-400 mV with an additional pulse voltage up to 0.8V is used to optimize the efficiency of the hydrogen production system. In some embodiments, a voltage of 1.1V is the highest overall voltage applied. In some other embodiments, a constant voltage 1.1V is applied at the electrodes during the hydrogen gas generation stage. In some other embodiments, a voltage less than 1V is applied at the electrodes during the hydrogen gas generation stage.

When a voltage exceeding 1.1V is applied, the solution in the system is observed turning from clear solution to brown color. It is observed that the hydrogen production rate drops significantly when a voltage higher than 1.1V is applied.

In the aspect of optimizing catalyst formulation, various formulations are chosen to optimize the efficiency of the hydrogen production system. In some embodiments, 25 mg/L of Al is used and an optimized reaction rate (hydrogen production rate) is able to be obtained by increasing the amount of silver used. The reaction rate is doubled when 50 mg of silver is used compared to when 25 mg of silver is used. The reaction rate is tripled when a triple amount of the silver is used. To optimize the efficiency of the hydrogen production system, a pre-selected/incremental amount of silver is able to be added until the highest hydrogen production rate/amount is reached. By adjusting the amount of silver added, the efficiency of the hydrogen production system is able to be optimized. A person of ordinary skill in the art appreciates that other chemical ratios (such as various ratios of the starting materials, e.g., Al:Ag:Cu) are able to be optimized/adjusted to optimize the reaction rate.

In the aspect of chloride ion ($Cl^-$) removal, chloride ion is important at the catalysts preparation (Redox) stage, but the chloride ion is able to act negatively to the efficiency of the hydrogen production during normal operation (after the catalysts preparation stage). In some embodiments, devices and methods are used to remove chloride ions from the hydrogen production system during the operational phase (generation stage) stage. The removal of a chloride ion is able to prevent the precipitation of silver, because silver chloride has a low solubility in water solution. A person of ordinary skill in the art appreciates that any other devices and methods that are able to be used to prevent the precipitation of the starting materials or the reacting chemical substances. Other methods and devices are able to be used to optimize the efficiency of hydrogen production system, such as adding another chemical substance that can form a precipitation with the chloride ions such that the chloride ions are able to be removed from the system.

Other aspects are able to be used to optimize the efficiency of the hydrogen production system, such as sodium ion (Na+) removal, sediment removal, and filtration of the water. Sediment is able to build up during the hydrogen production reactions. The sediments are able to come from the metal ions and minerals from the water supply. Removal of the sediments, such as MgO and CaO, that are building up in the reaction, is able to prevent the precipitation of the reacting chemical substance and/or prevent the clogging of the fluid transportation such that the efficiency of the hydrogen production system is able to be optimized.

Water filtration is another aspect that is able to be used to optimize the efficiency of the hydrogen generation system. The filtration is able to be done by various ways to remove unwanted ions and chemical substances, such as ion exchange membrane and size exclusion membranes. Distillation is also able to be used to purify the water used in the system. A person of ordinary skill in the art appreciates that any other methods and devices that can be used to remove unwanted particles, ions, and any other chemical substances are within the scope of the present invention.

In an aspect, a method of optimizing a hydrogen producing system comprising producing hydrogen gas using a hydrogen producing formulation containing Al(OH)x, copper, and silver, wherein x is 1, 2, 3, or 4 and removing a chemical substance that reduces the efficiency of the producing hydrogen gas. In some other embodiments, the chemical substance comprises $Cl^-$. In other embodiments, the chemical substance comprises $Na^+$. In some other embodiments, the chemical substance comprises a sediment. In some embodiments, the removing the chemical substance comprises using a filter. In other embodiments, the filter comprises a reverse osmosis filter. In some other embodiments, the filter comprises a PTFE membrane. In some embodiments, the filter comprises an ion exchange filter. In other embodiments, the filter comprises a Downs Cell. In some other embodiments, the removing the chemical substance comprises controlling a $Cl^-$ concentration to prevent a formation of AgCl precipitation. In some embodiments, the method further comprises applying a voltage to Al metal, Cu metal, Ag metal, or a combination thereof. In other embodiments, the voltage is no less than 1.1V. In some other embodiments, the hydrogen gas is produced at a voltage no greater than 1V.

In another aspect, a method of making a hydrogen generating system comprises preparing a hydrogen generating catalyst containing aluminum, copper, and silver and applying a pulsed voltage to the hydrogen generating catalyst. In some embodiments, the method further comprises applying a voltage incrementally until a drop of a current. In other embodiments, the method further comprises increasing a density of the hydrogen generating catalyst on an electrode. In some other embodiments, the method further comprises applying a voltage to the aluminum, wherein the aluminum comprises an aluminum metal. In some embodiments, the method further comprises applying a voltage to the copper, wherein the aluminum comprises a copper metal. In some other embodiments, the method further comprises adding aluminum metal to increase a rate of hydrogen gas production until an applied current drops. In some other embodiments, the method further comprises adding $AgCl_{(s)}$. In some embodiments, the method further comprises adding $HCl_{(aq)}$.

In another aspect, a hydrogen producing system comprises a hydrogen producing catalyst containing Al(OH)x, copper, and silver, wherein x is 1, 2, 3, or 4, a hydrogen generating voltage applied to the hydrogen producing catalyst to generate hydrogen gas, and a catalyst regenerating device to regenerate the hydrogen producing catalyst to a chemical state generating the hydrogen gas when the hydrogen generating voltage is applied. In some embodiments, the hydrogen producing system further comprises applying a catalyst preparing voltage to aluminum metal, copper metal, or a combination thereof. In other embodiments, the catalyst preparing voltage is higher than 1.1V. In some other embodiments, the hydrogen generating voltage is lower than 1V. In some embodiments, the catalyst regenerating device comprises a light. In other embodiments, the catalyst regenerating device comprises copper, silver, or both in a chemical state capable of coordinating with $OH^-$. In some other embodiments, the hydrogen producing system further comprises a computer automatic controlling system. In some embodiments, the computer automatic controlling system optimizes a hydrogen producing rate automatically.

DETAILED DESCRIPTION OF THE PREFERRED EMBODIMENT

Illustrative System

Figure 1:
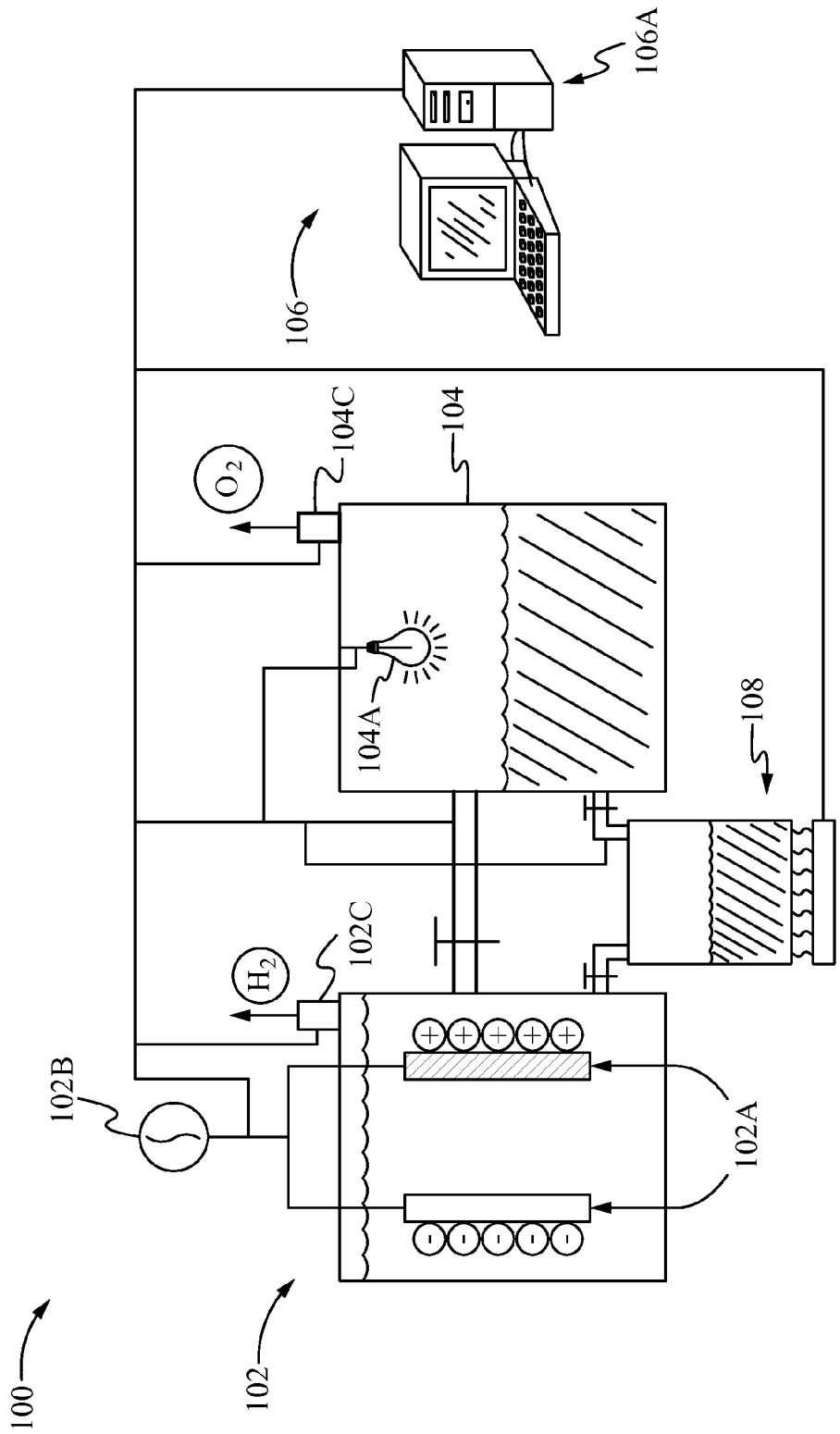
FIG. 1 illustrates a hydrogen generating system in accordance with some embodiments.

FIG. 1 illustrates a system 100 in accordance with some embodiments. In some embodiments, the apparatus for the hydrogen generation through water decomposition includes: a main reactor 102, an oxidizer reactor 104, a heat source 108, and a computer-control system 106. In some embodiments, the main reactor 102 is a chamber where hydrogen is generated. Further, the main reactor 102 contains electrodes 102A, reactants, catalysts, and solvents contained therewithin. The electrodes 102A contain iron, graphite, stainless steel, alloy, or any other proper materials. In some embodiments, the stainless steel includes Stainless 302, 316, 316L, 421. In some embodiments, the electrodes are metal alloy, such as Fe/Al or Fe/Cr/Mn and Fe/Si/Mn alloys. In some embodiments, the alloys have a Fe/Al mole or weight ratio of 97/3, 95/5, or 93/7. At pre-generation stage (pre-treatment: before running the hydrogen gas generating reaction), a pre-generation voltage is applied to the electrodes 102A. In some embodiments, the voltage is provided by a power source 102B. In some embodiments, the pre-generation voltage applied is between 0.8V and 3.0V. Alternatively, the pre-generation voltage applied is about 5V or any voltage between 0.2V and 10.0V. In some embodiments, a pre-generation voltage of −2.5V or 0V is applied to a graphite electrode and +1.7V is applied to aluminum metal for 15 minutes, a pre-generation voltage of 1.4V is applied to copper metal for 10 minutes, and a pre-generation voltage of 1.0V is applied to silver metal for 5 minutes when ionizing the metals in the reaction solution. In alternative embodiments, a pre-generation voltage of −2.5V is applied to a graphite electrode and a pre-generation voltage of +2.5V is applied to aluminium, copper, and silver metals concurrently for about 30 minutes when ionizing the metals into the reaction solution.

In the hydrogen generating stage (electric-hydrolysis reactions) in some embodiments, a voltage between −0.4V and −0.9V is applied to a stainless steel electrode (cathode). The voltage range mentioned above is an example, and other possible voltages are able to be applied. The reactants and catalysts of the system include the hydrogen-generating substance, water, and salts.

In some embodiments, the water used has a salinity of about 1.5% by weight. Other suitable percentages of salinity are able to be used, such as sea water, which has salinity about 3.8%. The salts used are able to include NaCl (sodium chloride), $CaCl_2$ (calcium chloride), $Na_2CO_3$, or other suitable ion sources. The gases generated, such as hydrogen, are transferred out through the pipe 102C. After or during the reaction, the solution in the main reactor 102 flows to the oxidizer reactor 104 for oxygen reactions. In some embodiments, $HCl_{(aq)}$ is added to the solution to facilitate the hydrogen generating reaction.

In some embodiments, the oxidizer reactor 104 is configured for photolysis or thermolysis for the oxygen-liberation reactions. The light source 104A generates light for the photolysis reaction. A heat source (not shown in the figure) generates heat for thermolysis. In some embodiments, the temperature for the thermolysis reaction is less than 200° C. In other embodiments, the temperature for the thermolysis reaction is equal to or above 200° C. In some embodiments, the heat source transfers and/or collects environmental heat to be used by the system 100. The gases generated are transferred through the pipe 104C.

In some embodiments, the heat source for the hydrogen generating reaction (electro-catalytic-hydrolysis) is able to be an independent heat exchanger 108. A person skilled in the art will also appreciate that the heat source is able to be installed in the main reactor 102 or in any other suitable chambers.

In some embodiments, the computer-controller 106 controls the operations of the system 100 and monitors the status of the reaction conditions in each of the reaction reactors. The computer-controller 106 contains a controlling software application 106A to control and monitor reaction conditions, such as pH value, temperature, salinity, applied voltage (pre hydrogen generating stage, hydrogen generating stage, and/ or both), purity and quantity of the gases generated, water level, catalyst formulation, catalyst reaction characteristics, and solution level in the main reactor 102 and the oxidizer reactor 104. A person skilled in the art appreciates that the computer-controller 106 is able to be used for any other purposes, including controlling and adjusting the reaction conditions.

A person skilled in the art appreciates that the above stated setup is one of the examples. Other proper setups are able to be applied to the system. For example, the reaction reactors 102 and 104 are able to be combined into a single reactor. Additional reaction reactors are able to be added.

Reactions

In some embodiments, a system uses the following reactions to generate hydrogen by decomposing water: (1) REDOX reaction, (2) pre-generation reaction, (3) generation reaction, (4) regeneration reaction, (5) second hydrogen reaction, and (6) oxygen reaction.

(1) REDOX Reaction

The REDOX reaction prepares a prehydrogen-generating substance by oxidizing or reducing the starting materials. Subsequently, the hydrogen-generating substance reacts with water or hydroxide. The REDOX reaction is illustrated in equation (1). Equation (2) illustrates that the prehydrogen-generating substance reacts with water to form the hydrogen-generating substance. A person skilled in the art will appreciate that the hydrogen-generating substance is able to carry a certain amount of surrounding water in its surrounding sphere.

$$M \rightarrow M^{x+} + xe^- \quad (1)$$

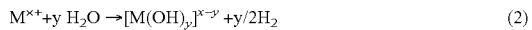

$$M^{x+} + y\,H_2O \rightarrow [M(OH)_y]^{x-y} + y/2\,H_2 \quad (2)$$

In the equations (1) and (2), M and its ion form represent the core of the hydrogen-generating substance and x and y represent charge parameters for an oxidation state or reaction stoichiometry.

A person of ordinary skill in the art will appreciate that the REDOX reaction is one exemplary model, and the starting material is not required to go through the REDOX reaction to become an active catalyst and/or a hydrogen-generating substance for the hydrogen generation.

(2) Pre-generation Reaction

In some embodiments, the pre-generation reaction is a step of setting up the AID (Active Ion Displacement) condition for the generation reaction. The pre-generation reaction applies a minimum starting voltage (eg. 0.5V DC) to the electrodes in the solution that contains the hydrogen-generating substance. The pre-generation reaction makes the hydrogen-generating substance, such as $[Al(OH)_3 \cdot xH_2O]$ complex, compact onto/ couple with the Fe electrode surface. The pre-generation reaction is a process that requires a low applied voltage. In some embodiments, it is observed that the pH of the solution is raised during the pre-generation reaction, and it is able to result from the liberation of the $OH^-$ groups to the solution.

(3) Generation Reactions

In some embodiments, the generation reaction generates hydrogen and depletes the hydrogen-generating substance. For example, when the hydrogen-generating substance is $[Al(OH)_3]$, the generation reaction generates hydrogen gas and produces a depleted hydrogen-generating substance, $[Al(OH)_4]^-$. The substance $[Al(OH)_3]$ is used herein as an example. The hydrogen-generating substance is also able to be $[M(OH)_4]^-$, $[M(OH)_3]$, $[M(OH)_2]^+$, $[M(OH)]^{2+}$, $M^{3+}$, or other suitable chemicals that are able to perform similar reactions as described above.

Active Ion Displacement (AID)

In some embodiments, the generation reaction is achieved by an active ion displacement (AID) reaction. The chemical reaction of the AID is illustrated in equation (3).

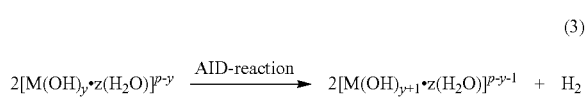

$$2[M(OH)_y \cdot z(H_2O)]^{p-y} \xrightarrow{\text{AID-reaction}} 2[M(OH)_{y+1} \cdot z(H_2O)]^{p-y-1} + H_2 \quad (3)$$

In the equation (3), $[M(OH)_y \cdot z(H_2O)]^{p-y}$ is the chemical state of the hydrogen-generating substance before the performance of the generation reaction. Z represents the number of water molecules surrounding the core of the hydrogen-generating substance. P-Y represents the charges of the hydrogen-generating substance binding/associating with y equivalents of hydroxide. Y represents the number of hydroxides binding/ associating to the hydrogen-generating substance before the AID reaction. Through the AID reaction, the $[M(OH)_y \cdot z(H_2O)]^{p-y}$, with the assistance of applied electric charge, becomes $[M(OH)_{y+1} \cdot (z-1)(H_2O)]^{p-y-1}$. Equation (3) is an example that illustrates some embodiments of the present invention. For example, the $[M(OH)_y \cdot z(H_2O)]^{p-y}$ is able to be $[Al(OH)_3 \cdot x(H_2O)]$ and the $[M(OH)_{y+1} \cdot (z-1)(H_2O)]^{p-y-1}$ is able to be $[Al(OH)_4 \cdot (x-1)(H_2O)]^-$. A person skilled in the art appreciates that the hydrogen-generating substance is also able to be in other chemical states, contain any other suitable number of hydroxide groups, or contain other suitable ligands. In some embodiments, external heat aids the AID reaction.

The AID reaction is able to reduce water and associate the $OH^-$ group with the hydrogen-generating substance. The AID reaction is further illustrated in equation (4), where $[Al(OH)_3 \cdot x(H_2O)]$ is used as an example of the hydrogen-generating substance. The x equivalent of water surrounding the core of the hydrogen-generating substance is used as an example. In some embodiments, the hydrogen-generating substance is able to use the water in the solution directly.

(4)

Figure 2A:
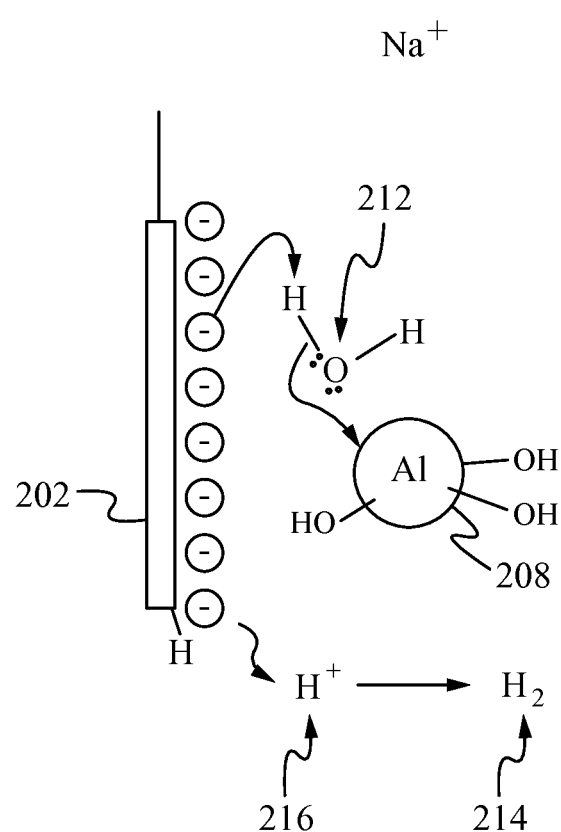
FIGS. 2A and 2B illustrate the generation and regeneration reactions in accordance with some embodiments.

FIG. 2A shows the reaction between the hydrogen-generating substance 208 and the water molecules 212. In some embodiments of the AID reactions, the hydrogen-generating substance 208 is [Al (OH)$_3$·x(H$_2$O)], which reacts with the water molecules 212 and generates protons (H$^+$) 216 or hydrogen 214. The AID reactions are able to be assisted by an applied voltage, which is applied to the electrode 202. These mechanisms are described as examples. A person skilled in the art would appreciate that the hydrogen gas is able to be generated through a hydride and a proton or any other suitable way of generating hydrogen gas. The hydrides and protons described in this disclosure are able to bind/associate to the hydrogen-generating substance, be generated by the hydrogen-generating substance, and bind to other compounds in the solution. It is known by a person skilled in the art that amphoteric properties of aluminum hydroxides are able to add efficiency to the AID reaction of the generation reaction. It is observed that the pH of the solution is increased during the AID reaction, which is able to be resulted from the generation/liberation of the hydroxide in the AID reaction. In some embodiments, the pH value is able to be controlled by the flow rate/concentration of Catalyst Base Formulation (CBF) through the Reactor Core and Oxydizer. In some embodiments, the CBF is the hydrogen generation substance.

A person skilled in the art appreciates that the hydrogen-generating substance is able to generate hydrogen through protons, hydrides, or combinations thereof by a single molecule or by multi-molecules or atoms, such as alloys and a plurality of the same or different metal centers.

(4) Regeneration Reactions

In some embodiments, the regeneration reaction regenerates the hydrogen-generating substance from the depleted hydrogen-generating substance. For example, the [Al (OH)$_4$·(x−1)(H$_2$O)]$^-$ is able to be regenerated back to [Al(OH)$_3$·x (H$_2$O)] or to [Al (OH)$_3$·(x−1)(H$_2$O)].

The generation reaction and the regeneration reactions make the whole reaction work in a catalytic manner until the hydrogen-generating substance converts to a less active or another stable state (unuseable compound).

The chemical equation of the regeneration reaction is illustrated in equation (5).

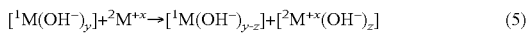
(5)

In the equation (5), [$^1$M(OH$^-$)$_y$] is the depleted hydrogen-generating substance, and $^2$M$^{+x}$ is a regenerating substance. The regeneration reaction strips or liberates the hydroxide group bonded/associated to the depleted hydrogen-generating substance, so the hydrogen-generating substance regenerates from the state of depleted form, [$^1$M(OH$^-$)$_y$], directly or indirectly back to the previous chemical state, such as [$^1$M(OH$^-$)$_{y-z}$]. The $^2$M$^{+x}$ is acting as a hydroxide shuttle, such as Ag, Ag(OH), Cu, and Cu(OH)$^{+1}$, that removes or carries the hydroxide group from the depleted hydrogen-generating substance. The above equation is an example to illustrate the concept of this disclosure. A person skilled in the art appreciates that the hydrogen-generating substance is able to be in other oxidation states, contain any other suitable number of hydroxide groups, or contain other suitable ligands.

The regeneration reaction is able to dissociate the OH$^-$ group away from the hydrogen-generating substance with which OH$^-$ originally bonds/associates. The regeneration reaction is illustrated in equations (6) and (7) using [Al(OH)$_4$·(x−1)(H$_2$O)]$^-$ as the example of the depleted hydrogen-generating substance. A person skilled in the art appreciates that the regeneration reaction is also able to occur between Ag(OH)$_r$ and Cu(OH)$_r$, which are able to act as the hydroxide shuttle for each other. R represents the numbers of hydroxides that are associated with the core of the hydroxide shuttle, and the value of R is able to be 0, 1, 2, or any other suitable number.

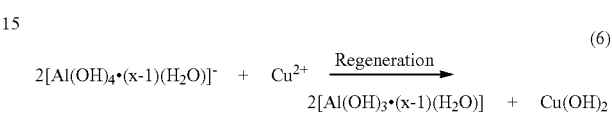
(6)

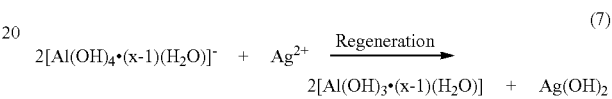
(7)

Figure 2B:
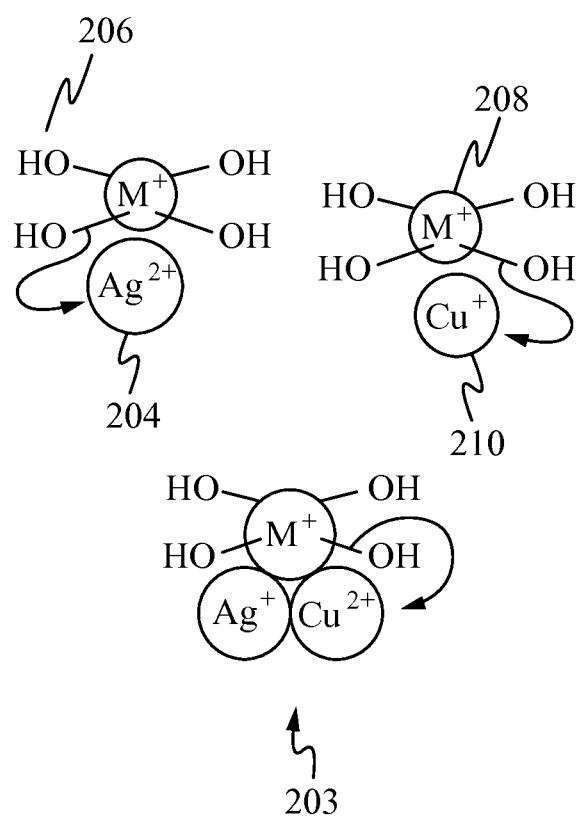

FIG. 2B illustrates a regeneration reaction in accordance with some embodiments. The hydrogen-generating substance 208 binds/associates with the hydroxide group 206. The hydroxide shuttles 203, 204, or 210 are able to take the hydroxide group 206 away from the depleted hydrogen-generating substance 208. The hydroxide shuttle is able to be a silver ion 204, a copper ion 210, an aluminum ion (not shown in the figure), multi-ion center aggregation 203, or other chemicals that take up the hydroxide group 206.

The term "regeneration reaction" includes any reactions that revive the depleted hydrogen-generating substance back to the hydrogen-generating substance that is active as a catalyst for assisting the electric hydrolysis. The term "hydroxide shuttle" is used as an illustration of the present invention, and the hydroxide shuttle is able to include any structure to remove any chemical substance from the hydrogen-generating substance. As such, the hydroxide shuttle is not limited to removing only hydroxyl groups. The hydroxide shuttle is able to act as a shuttle to remove hydrides, hydrogen, or other substances that bind to or associate with the hydrogen-generating substance.

(5) Second Hydrogen Reaction

In some embodiments, the generation reaction produces a depleted hydrogen-generating substance, which is bonded with the additional hydroxide group. The regeneration reaction uses hydroxide shuttles to take the hydroxide group from the depleted hydrogen-generating substance. After taking the hydroxide group from the depleted hydrogen-generating substance, the hydroxide shuttle bonds with the hydroxide group. Subsequently, the second hydrogen reaction converts the hydroxide group bonded on the hydroxide shuttle into hydrogen proton/gas and metal oxide. For example, Ag$^{2+}$ or Ag$^+$ takes hydroxide from [Al(OH)$_4$·(x−1)(H$_2$O)]$^-$ and becomes Ag(OH)$_2$ or Ag(OH) through the regeneration reaction. The second hydrogen reaction converts Ag(OH)$_2$ into AgO and/or Ag$_2$O and hydrogen. In some embodiments, the above-mentioned reactions occur in the main reactor (e.g., reactor 102 in FIG. 1).

(6) Oxygen Reaction

In the oxygen reaction, the oxygen of the metal oxide, which is generated in the second hydrogen reaction, is released from the metal oxide through photolysis, thermal decomposition, or other suitable chemical reactions or physical interactions. Through the oxygen reaction, the hydroxide shuttle is regenerated, and the hydroxide shuttle is able to take one or more hydroxide group from the depleted hydrogen-generating substance or other hydroxide shuttle having bonded hydroxide again. For example, the silver ion is regenerated from silver oxide (AgO) through an oxygen reaction. In some embodiments, the energy source of the photolysis for the oxygen reaction is visible light, UV waves, microwaves, radio frequency waves, gamma rays, x-rays, IR waves, or any other type of energy that a person skilled in the art would appreciate. In some embodiments, the metals that can be used as the hydroxide shuttle include aluminium, alumina, copper, iron, silver, zinc, magnesium, gallium, nickel, or any other metal or nonmetal material or compounds that are capable of taking up hydroxide groups. The metal ion mentioned above is able to be in various oxidation states. For example, a silver ion is able to be Ag metal, $Ag^+$, $Ag^{2+}$ or $Ag^{3+}$.

A person skilled in the art appreciates that the oxygen reaction is able to be performed with heat, light, or other suitable energy sources. Further, a person skilled in the art appreciates that the second hydrogen reaction and the oxygen reaction are able to be part of the hydrogen-generating reactions, and the so-called hydroxide shuttles are able to be part of the hydrogen-generating substance.

Overall Reactions

Figure 3:
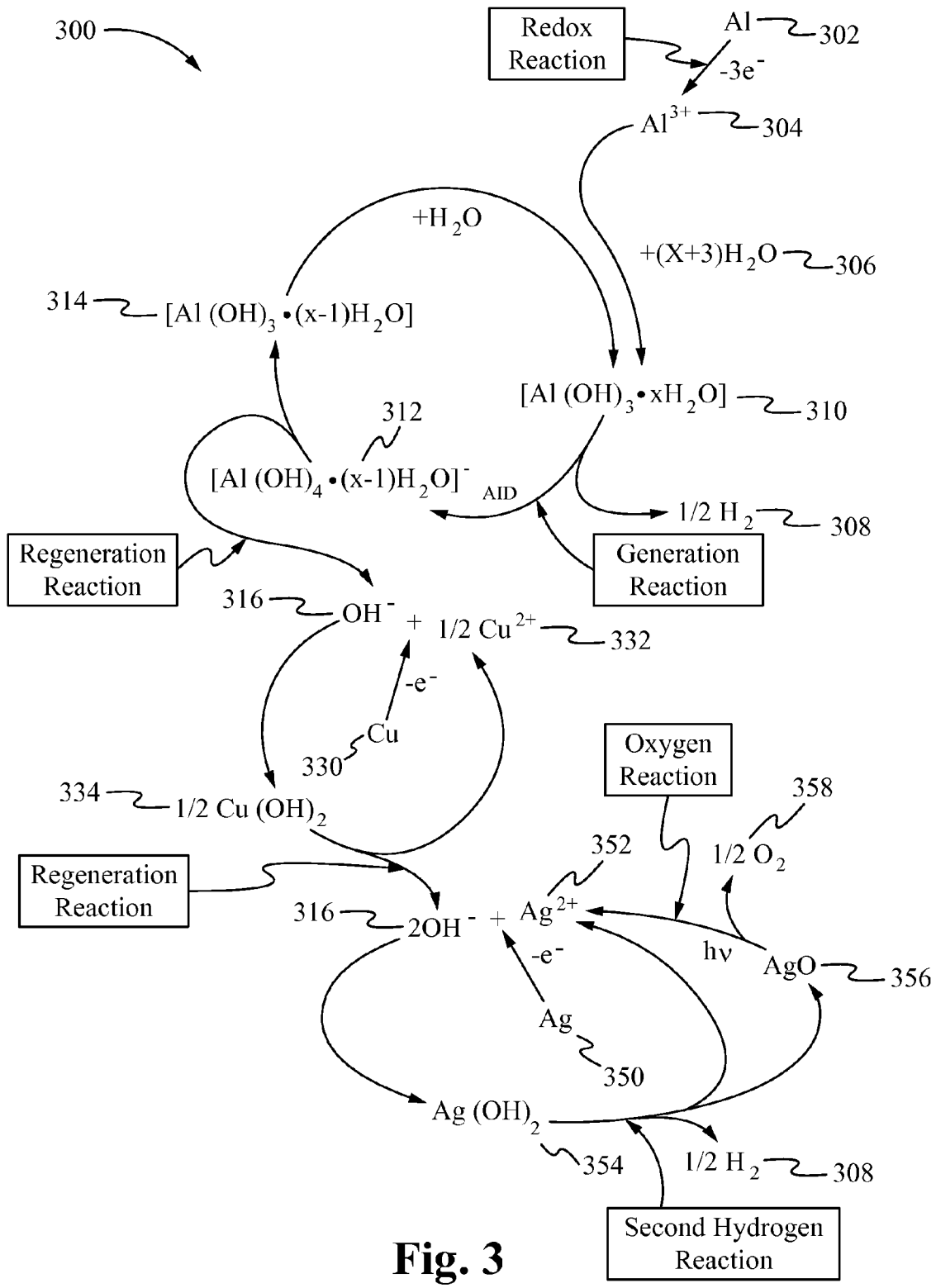
FIG. 3 illustrates the overall reaction of a system in accordance with some embodiments.

FIG. 3 illustrates an overall reaction cycle 300 in accordance with some embodiments. The reaction begins with an aluminium (Al) metal 302. Through the REDOX reaction, the Al metal 302 becomes $Al^{3+}$ 304. Alternatively, the aluminium ion 304 is generated from other sources of Al ion such as bauxite, $Na[Al(OH)_4]$, $Al(OH)_3$, $NaAlO_2$, $Na_2AlO_4$, $Na_5AlO_4$, $NaAl_{11}O_{17}$, or any other suitable Al ion sources. The Al ion 304 reacts with water ($H_2O$) 306, generating hydrogen gas 308 and the hydrogen-generating substance, aluminium hydroxide $[Al(OH)_3 \cdot x(H_2O)]$ 310. With the assistance of AID prepared hydrogen producing substrate after the pre-generation phasing, the hydrogen-generating substance 310 reacts with two surrounding water molecule. Hydrogen gas is generated in the generation reaction and the hydrogen-generating substance becomes a depleted hydrogen-generating substance, $[Al(OH)_4 \cdot (x-1)(H_2O)]^-$, 312. The regeneration reaction removes one $OH^-$ ion from $[Al(OH)_4 \cdot (x-1)(H_2O)]^-$, 312; thus, the depleted hydrogen-generating substance, $[Al(OH)_4 \cdot (x-1)(H_2O)]^-$, 312 becomes the substance $[Al(OH)_3 \cdot (x-1)(H_2O)]$ 314. Subsequently, the $[Al(OH)_3 \cdot (x-1)(H_2O)]$ 314 associates with water and turns back into $[Al(OH)_3 \cdot x(H_2O)]$ 310. Through the generation and regeneration reactions, the hydrogen-generating substance works in a catalytic manner.

In some embodiments, the regeneration reaction uses a copper ion 332 or a silver ion 352 as the hydroxide shuttle. The copper ion 332 and the silver ion 352 are able to be generated through REDOX reactions from metal copper 330 and silver 350 or prepared from other suitable ion sources. The hydroxide shuttles take up the hydroxide groups 316 and become a hydroxide-bonded hydroxide shuttle, such as $Cu(OH)_2$ 334 or $Ag(OH)_2$ 354. A person skilled in the art appreciates that the hydroxide shuttle is able to be in various oxidation states and bonded with various numbers of hydroxides 316.

In some embodiments, the second hydrogen reaction generates more hydrogen and converts the hydroxide-bonded hydroxide shuttle, such as $Ag(OH)_2$ 354, into a metal oxide, such as AgO or $Ag_2O$ 356, or a silver ion.

In some embodiments, the oxygen reaction generates oxygen 358 and renews the metal oxide, such as AgO 356, into a renewed hydroxide shuttle. Through the second hydrogen reaction and the oxygen reaction, the hydroxide shuttles work in a catalytic manner.

Figure 4:
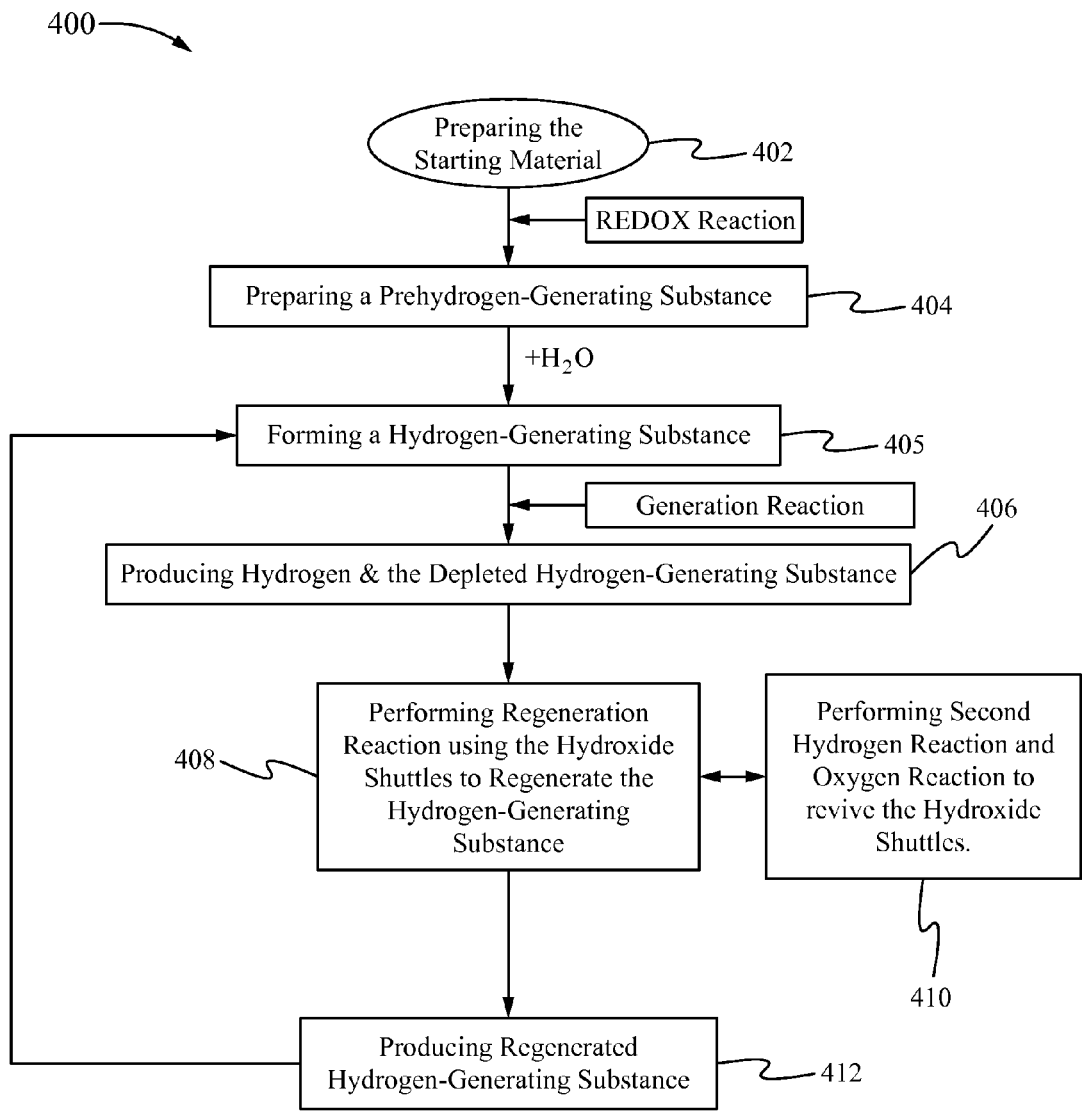
FIG. 4 illustrates a process of a hydrogen generating reaction in accordance with some embodiments.

FIG. 4 further illustrates a process of the electrically controlled hydrogen-generation reaction 400 in accordance with some embodiments. The process begins with preparing the starting material 402. At the step 404, the hydrogen-generating substance is prepared by the REDOX reaction. At the step 405, the hydrogen-generating substance reacts with water and becomes active hydrogen-generating substance.

At the step 406, the generation reaction makes the hydrogen-generating substance react with water or intramolecular hydrolysis reaction through an applied voltage potential to produce hydrogen gas via electric-hydrolysis reactions. The hydrogen-generating substance becomes a depleted hydrogen-generating substance. At the step 408, the regeneration reactions use hydroxide shuttles to regenerate the depleted hydrogen-generating substance. At the step 410, the second hydrogen reaction and the oxygen reactions revive the hydroxide shuttle. At the step 412, the hydrogen-generating substance is regenerated. After the step 412 the process goes back to the step 405, and the whole reaction works in a catalytic manner.

A person skilled in the art appreciates that the above process is an example. All steps are optional and additional steps are able to be added. Further, the reactions are able to go through other mechanisms.

Experiments

Figure 5:
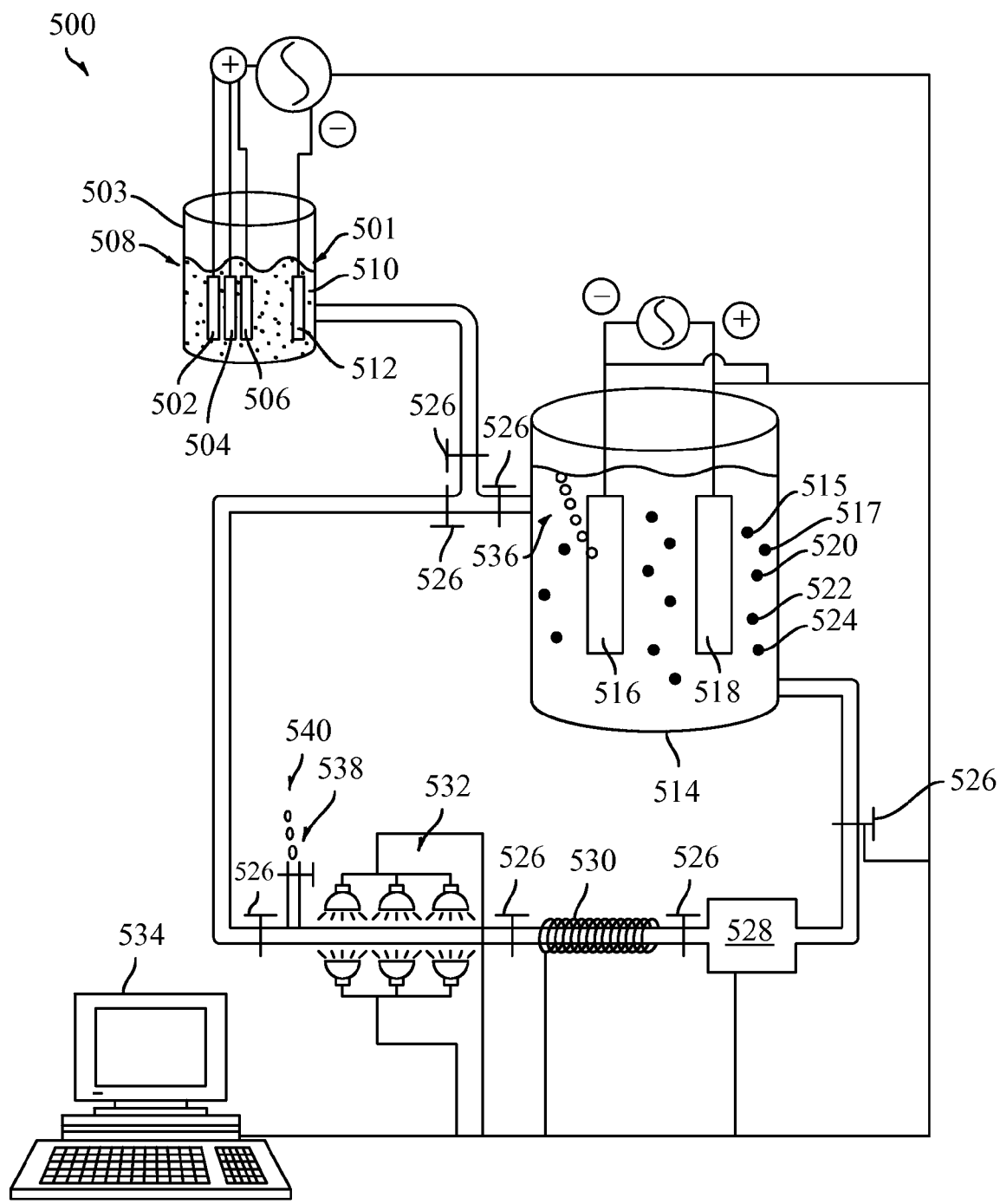
FIG. 5 illustrates a setup in accordance with some embodiments.

FIG. 5 illustrates a system 500 in accordance with some embodiments. The apparatus 500 includes a preparation reactor 503, a main reactor 514, a photochemical/oxidizer reactor 532, and a thermal converter 530.

In some embodiments, the experiments are performed as follows. The reaction begins with preparing a solution 501 containing 250 mg of Al 502 metal, 50 mg of Cu 504 metal, 25 mg of Ag 506 metal, a graphite electrode 512 and 1 liter of water 508 having 1.5% NaCl 510 by weight. A negative voltage of −1.7V is applied to the graphite electrode 512 and a positive is applied to the Al metal 502 for 15 minutes. Next, the first positive voltage applied to the Al metal 502 is removed, and a second positive voltage of 1.4V is applied to the Cu metal 504 for 10 minutes while the negative voltage of −2.5V is applied to the graphite electrode 512. Next, the second positive voltage is removed from the Cu metal 504, and a third positive voltage of 1.0V is applied to the Ag metal 506 for 5 minutes with the negative voltage still applied to the graphite electrode 512. The temperature of the solution is maintained at 88° F. In some embodiments, the procedures that are described above include ionizing the metals into the solution. In some embodiments, the procedures are for catalysts preparation.

Next, the solution 501 is transferred to the main reaction vessel 514. The main reaction vessel 514 contains aluminium ions 515, copper ions 517, silver ions 520, sodium ions 522, and chloride ions 524. The term "ion" comprises all ligand states of a metal. For example, an aluminium ion includes $Al^{3+}$ or $Al(OH)_x$, where the x represents the coordinated ligand numbers of the aluminium ion. In some embodiments, a voltage between 0.4V and 0.9V is applied to the cathode of the electrodes. In alternative embodiments, a voltage of 0.85V is applied to the cathode of the electrodes. In other embodiments, a voltage not exceeding 0.9V is applied to the cathode of the electrodes, because some experiments indicate that hydrogen production is reduced when a voltage exceeding 0.9V is applied. In some embodiments, the applied voltage of the anode is at 0V compared with a voltage on the standard hydrogen electrode. In alternative embodiments, the anode of the electrode is the reference electrode, which has a voltage of 0V. In some embodiments, the voltage is applied in a way that a negative charge is applied to the stainless steel electrode 516 and a positive charge is applied to the graphite electrode 518. A hydrolysis reaction begins to occur when sufficient voltage is applied, and hydrogen gas 536 is generated at the stainless steel electrode 516 when the voltage is applied to the stainless steel electrode 516 and the graphite electrode 518. After 30 minutes or when the amount of hydrogen gas production begins to decrease, the solution in the vessel 514 is transferred through the heater 530 and passed under the LED lights 532 to produce a photolysis reaction. Oxygen gas 540 is collected at the outlet 538 during the photolysis reaction. The solution is transferred back to the main reaction vessel 514 for hydrogen production.

In some embodiments, a control system 534 is connected to all the components of the system 500, including the preparation vessel 503, the main reaction vessel 514, valves 526, the heater 530 and/or heat exchanger, the LED lights 532, and all the electrodes 502, 504, 506, 512, 516, 518. In some embodiments, the control system 534 comprises one or more computers, which are able to automate the control of each of the components of the system 500. Accordingly, the control system 534 is able to automate the whole electric-hydrolysis process when predetermined conditions have been reached. For example, the control system 534 is able to initiate the reaction automatically by applying a voltage to the preparation vessel 503 when hydrogen gas is needed. The control system 534 is able to stop the ionization process of the metals automatically when a preset condition has been reached, such as, a preset pH value or an applied voltage. Similarly, the control system 534 is able to transfer the solution 501 automatically to the various chambers or vessels by controlling the pump 528 and the valves 526.

The control system 534 is able to control the system 500 remotely. For example, the system 500 is able to be controlled through a website, over the Internet or using a telephone or PDA. In some embodiments, all of the processes of the system 500 are able to be all automated, triggered by at the occurrence of predetermined conditions, such as by using a preset timer or indicator of low fuel of a car.

Figure 6:
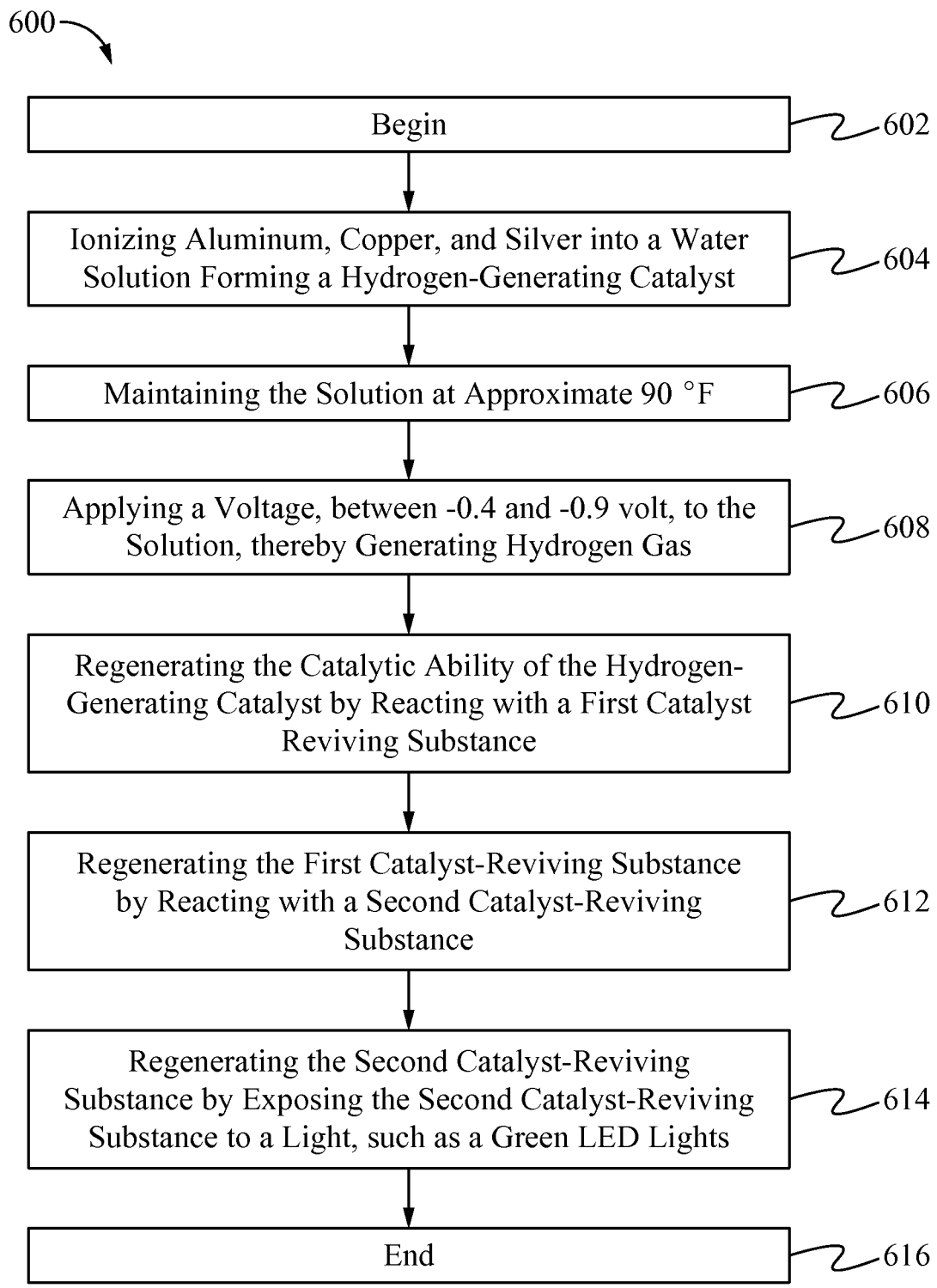
FIG. 6 illustrates a method of electric-hydrolysis reaction for hydrogen production in accordance with some embodiments.

FIG. 6 illustrates a method of electric-catalytic-hydrolysis reaction 600 for hydrogen production in accordance with some embodiments. The method begins at the step 602. In a step 604, aluminum, copper, and silver are ionized into a water solution, forming a hydrogen-generating catalyst. In a step 606, the solution is maintained at approximately 90° F. In a step 608, a voltage, between −0.4 and −0.9 volts, is applied to the solution or the cathode of the electrodes, thereby generating hydrogen gas. In a step 610, the catalytic ability of the hydrogen-generating substance is regenerated by reacting with a first catalyst-reviving substance. In a step 612, the first catalyst-reviving substance is regenerated by reacting with a second catalyst-reviving substance. In a step 614, the second catalyst-reviving substance is regenerated by exposing it to a light, such as green LED lights. The method 600 ends at a step 616.

As described above, some embodiments of the present invention are able to include the following chemical reactions: a REDOX reaction, a pre-generation reaction, a generation reaction, a regeneration reaction, a second hydrogen reaction, and an oxygen reaction. Alternatively, some embodiments are able to include the following chemical reactions: a catalyst preparation reaction, a hydrogen generation reaction, a catalyst regeneration reaction, and a regeneration reaction to regenerate the catalyst regeneration substance.

Optimization of the Reactions

Methods of and devices for optimizing the efficiency, stability, and continuity of hydrogen and/or oxygen production systems are further disclosed below. As stated above, the factors that are able to be used for the system optimization including catalyst optimization treatment at the preparation stage (Redox/pre-generation), the selection of an optimal catalyst formulation, maintain the relative mole ratio of the chemical components of the catalyst formulation during the hydrogen producing stage (generation stage), chloride ion ($Cl^-$) removal during the generation stage of the catalysts, sodium ion ($Na^+$) removal, sediment removal, and filtration of the water used.

Electro Chemical States Enhancement

A method of preparing optimal Active Ion Displacement (AID) states on the Hydrogen Generation Substrate (HPS) and the Ground Electrode Assembly (GEA) is disclosed. The HPS is the site of hydrogen production and metal/catalysts reduction. $OH^-$ shuttle reactions also occur at the HPS. The GEA is the site for metal compound separation and ionization, catalyst by-product recovery, and contaminant separation process. By adding chemical components and applying a selected range of incremental voltage changes to the HPS and GEA electrodes, an active chemical state is able to be achieved which enables the AID process. The excited or ionic state at the electrodes enables a series of reactions within the catalyst based formulation (CBF) to take place which leads to the breakdown of water.

Pre-Generation Reaction

At the pre-generation reaction, the CBF of the HPS includes $Al(OH)_3$ and the CBF of the GEA includes $Cl^-$, $F^-$ and $Br^-$. The hydrogen producing reaction causes a depletion reaction of $Al(OH)_3$ and adding an $OH^-$ to the $Al(OH)_3$. At the GEA, $Cl^-$ is consumed or depleted. In some embodiments, the ratios of the chemical compositions in the CBF are adjusted to have an optimized ratio, such that the hydrogen production rate is able to be optimized. In some embodiments, pulsing a voltage of direct current across the HPS and GEA electrodes allows $Al(OH)_3$ to be attracted to and remain on the HPS electrode, such that an active AID surface barrier is created, which leads to an optimal hydrogen production rate. The following are factors that are able to be used to control the hydrogen production efficiency including (1) type of current, (2) polarity of current, (3) temperature, (4) applied base voltage and its range, (5) pulsed voltage and its range, (6) CBF molar ratios, and (7) voltage incremental timing and pulsing procedure.

Pre-generation reaction/phase is a process of (1) attraction, (2) collection, (3) consolidation, and (4) saturation of CBF compounds at the HPS and GEA electrodes. In some embodiments, a minimum initial voltage is applied and incrementally increased over time. As voltage increases, current is decreased until a maximum voltage is achieved.

In some embodiments, the AID active barrier state is increased by applying a pulsed voltage. In some embodiments, $Al(OH)_3$ is added in the solution to enhance the active state and decrease the needed time for preparing the pre-generation phase. Once the preparation of the HPS/AID barrier is completed, temperature or pH of the CBF does not affect the barrier. The following experiments in Table 1 show that a pulsed voltage shortens the time needed for pre-generation reaction.

TABLE 1

|  | Exp. 1 | Exp. 2 |
|---|---|---|
| Pulsing voltage | No | Yes (0.05 V-0.100 V over base voltage) |
| CBF | Al 25 mg/l, Cu 5 mg/l, NaCl 1.5% w/w, 10 L distilled water | Al 25 mg/l, Cu 5 mg/l, NaCl 1.5% w/w, 10 L distilled water |
| Temperature | 100° F. | 100° F. |
| Pressure | 1 atm | 1 atm |
| Base voltage | 0.100 V-0.150 V | 0.100 V-0.150 V |
| Current | 0.300 A-0.010 A | 0.300 A-0.010 A |
| Pulse period | N/A | 10 times/second |
| Pre-generation Phasing Duration | 2 hours | 20 mins |

Catalyst Based Formulation

The Catalyst Base Formulation (CBF) of the present invention is able to be catalytic substances/chemicals for water reduction reactions. In some embodiments, the CBF comprises several metal compounds and various ions. By itself, the CBF is able to be a stable, non reactive, non toxic and environmentally benign substance. However, once activated by the AID prepared electrodes, it is able to be an effective and efficient oxidizing and reducing agent.

In some embodiments, the CBF contains various chemical substances having different chemical reactions occurring at different chambers. At the Main Reactor Core (MRC), $Al(OH)_3$ contained in the CFB reacts with $H_2O$, which generates $H^+$ and $Al(OH)^-_4$. The proton is reduced to become hydrogen gas. The CBF is transferred from the MRC to an Accumulator. At the accumulator, $Al(OH)^-_4$ becomes $Al(OH)_3$ and $OH^-$. The $OH^-$ reacts with $Ag^+$ and become $Ag_2O$. The solution in the Accumulator is transported to an Oxidizer. At the Oxidizer, $Ag_2O$ is reduced to $Ag^0$.

In some embodiments, the CBF contains a composition having Ag metal, Cu metal, Al metal, $Cl^-$ and distilled/deionized water. In some embodiments, the CBF contains a composition coming from a voltage applied Ag metal, a voltage applied Cu metal, and a voltage applied Al metal. In some embodiments, sodium ions are used.

In some embodiments, different forms of CBF are chosen to control the hydrogen production rate. For example, a higher hydrogen production rate is achieved when smaller Ag particles are used, which is able to have a higher local Ag density on the electrodes. Accordingly, the preparation of CBF includes the selection of a form of the CBF. The selection of a form of the CBF includes having more available pre-selected ions in the solution, such as $Ag^+$ and $Cu^{2+}$, and having a larger reacting surface area.

In the following, a method of CBF preparation procedure is provided. Water, Al metal, and Cu metal are placed in the MRC and the Accumulator. Next, $AgCl_{(s)}$ is added to the MRC and the Accumulator. $HCl_{(aq)}$ and $NaCl_{(s)}$ are added to the solution. A voltage is applied to the Al metal and Cu metal. More $AgCl_{(s)}$, $HCl_{(aq)}$ and Al metal are added until the applied current drops to minimum. Also, more Al metal are added until the $H_2$ flow rate is maximized at the generation phase.

The following experiments show the effects of adding more of the one or more of the components of CBF and/or other chemical substances to the reaction media. The substances are added to the MRC after a completed pre-generation phase reaction. In one set of the experiments, 100 ml of 5M HCl is added. The result shows an increase of the $H_2$ flow rate from 50 ml/min to 75 ml/min over a 2 hour period. In another set of experiments, 50 ml of 10M $H_2SO_4$ is added. The result shows a short period, 2 min, of $H_2$ flow rate increases. In another set of experiments, 100 mg of $Na_2(CO_3)_2$ in 250 ml of water is added. The result shows that the hydrogen production is completely ceased and no change in the regeneration voltage and current. In another set of experiments, a voltage is applied to Al metal (5 mg) in water to form $Al(OH)_3$, which is added to the MRC. The result shows that the regeneration voltage is increased, the current is decreased, and the $H_2$ flow rate is increased. In another set of experiments, a voltage is applied to 25 mg of Cu metal in water and is added to the completed pre-generation phasing. The result shows no apparent change in $H_2$ or $O_2$ flow rate, regeneration voltage or current. However, the flow rate of $O_2$ stabilizes and increases gradually over time, which stays at a steady flow rate over time. In another set of experiments, a voltage is applied to Ag metal in water and added to a completed pre-generation solution. The result shows an increase of both $H_2$ and $O_2$ flow rate and no changes to the regeneration voltage or current.

Chlorine Ion Concentration

The existence of chloride ion in the CBF is able to facilitate the preparation of the pre-generation reaction. The proper amount of $Cl^-$ ensures the occurrence of the hydrogen production reaction. Excess amount of $Cl^-$ is able to cause the precipitation of $Ag^+$, because the two ions form AgCl. In some embodiments, a reverse osmosis filter, with PTFE (Polytetrafluoroethylene) membrane, or an ion exchange filer is used to remove excess $Cl^-$ from the reaction system. A person of ordinary skill in the art appreciates that any other devices and methods are able to be used, so long as the excess $Cl^-$ is able to be removed from the reaction system.

Sodium Ion Concentration

In some embodiments, sodium ion ($Na^+$) is removed from the system, because sodium ion is able to interfere with the hydrogen production reaction by affecting the chemical ratios in the CBF. In some experiments, $Na_2CO_3$ is added to the reaction solution. The addition of $Na_2CO_3$ stops the hydrogen producing reaction. The sodium is able to react with $Al(OH)_3$ reducing active $Al(OH)_3$ in the solution, so the hydrogen producing reaction is slowed down or completely ceased. In some embodiments, $Na^+$ reacts with $Al(OH)_4^-$ and forms $NaAl(OH)_4$. In some embodiments, a reverse osmosis filter, with PTFE (Polytetrafluoroethylene) membrane, or ion exchange filter is used to remove excess Na from the reaction system. A person of ordinary skill in the art appreciates that any other devices and methods are able to be used, so long as the $Na^+$ is able to be removed from the reaction system.

Sediment Removal

In some embodiments, a process of separating foreign sediment, debris, feedstock containment, and by-product compounds is performed. The present invention is able to use various water sources like (sea)water, municipal, gray water and other water sources to produce $H_2$ and $O_2$. The water source is able to bring in contaminate. Along time, trace contaminants buildup in the reaction chambers. Although water treatments, such as external filters (including Reverse Osmosis and Deionizer filters), are able to be used to prevent contaminant from entering into the reaction system. However, as trace contaminant builds up, keeping the CBF, system vessels, and tubing clear is important.

In some embodiments, electrodeionization or ion exchange membrane is used to remove the sediments. In other embodiments, flushing the internal chambers is a method used to remove the sediments. In some other embodiments, Downs Cell is used to remove the sediment. In some embodiments, sunlight and/or sodium hydroxide are used to remove chlorine in the system. In some embodiments, ions are charged to be removed from the system.

Water Source

In some embodiments, the water used for the hydrogen production reaction of the present invention includes the following properties, such as no solid precipitation, no dissolved solids, and no soluble compounds. In some other embodiments, water used is distilled water. The distilled water is able to come from using industrial waste heat to distill the water. In some other embodiments, desalinization, deionizer, and membrane filtration system are used to filter the water used. In some other embodiments, PTFE membrane is used to purify used water, and $Al(OH)_3$ and water are able to flow back to the system after the filtration process. In an exemplary system, a first stage filtration system, such as a pool filtration system, is able to be used to filter debris and bacteria/protein. At the first stage filtration system, debris and organisms are filtered out. A second stage filtration system includes a PTFE membrane filtration system, which is able to filter out large molecules. A third stage filtration system includes a flash steam distillation. Nitrates and sulfates, metal ions, and small molecule precipitates are trapped in the filter. Aromatics and dissolved gases are vented to the atmosphere. In some embodiments, a deionization device is included for filtering metal ions. In some embodiments, ultrafiltration membranes, ion exchange systems, and electrodeionization are used as the filtration system. In some embodiments, the water used is pre-treated with a reverse osmosis unit to remove an amount of the organic contaminant. In some embodiments, the term Aluminium used herein refers to all charge states and coordination numbers of the aluminium, such as $Al^{1+}$, $Al^{2+}$, $Al^{3+}$, $[Al(OH)]^{2+}$, $[Al(OH)_2]^{1+}$, $[Al(OH)_3]$, and $[Al(OH)_4]^{1-}$. Similar rules apply to the terms for copper and silver.

In operation, the hydrogen producing reaction is optimized by selecting the electrodes, voltages, and current to be applied, selecting a CBF having a composition that is able to have an optimized hydrogen producing rate and/or duration, maintaining an optimized chlorine concentration, removing sodium and sediments, and pre-filtering water to be used.

In utilization, the hydrogen production device is able to be used to generate hydrogen as a type of energy supply using environmentally non harmful chemicals and wasted heat.

All the steps that are contained in the methods/procedures described above are merely illustrative of the principles of the invention. All the steps are optional and all the steps, when applicable, are able to be performed in different sequences as desired. Additional steps are also able to be added when a person skilled in the art deems proper.

The present invention has been described in terms of specific embodiments incorporating details to facilitate the understanding of principles of construction and operation of the invention. Such reference herein to specific embodiments and details thereof is not intended to limit the scope of the invention. It will be readily apparent to one skilled in the art that other various modifications may be made in the embodiment chosen for illustration without departing from the spirit and scope of the invention.

What is claimed is:

1. A method of optimizing a hydrogen producing system comprising:
    a. producing hydrogen gas in a first reactor using a hydrogen producing formulation containing $Al(OH)x$, copper, and silver, wherein x is 1, 2, 3, or 4;
    b. producing the hydrogen gas in an optimized condition by maintaining an applied voltage between 0.4V and 0.9V to a solution containing the hydrogen producing formulation in the first reactor;
    c. removing a chemical substance that reduces the efficiency of the producing hydrogen gas; and
    d. regenerating the hydrogen producing formulation using a photolysis reaction, a thermolysis reaction, or a combination thereof in a second reactor.

2. The method of claim 1, wherein the chemical substance comprises $Cl^-$.

3. The method of claim 1, wherein the chemical substance comprises $Na^+$.

4. The method of claim 1, wherein the chemical substance comprises a sediment.

5. The method of claim 1, wherein the removing the chemical substance comprises using a filter.

6. The method of claim 5, wherein the filter comprises a reverse osmosis filter.

7. The method of claim 5, wherein the filter comprises a PTFE membrane.

8. The method of claim 5, wherein the filter comprises an ion exchange filter.

9. The method of claim 1, wherein the removing the chemical substance comprises controlling a $Cl^-$ concentration to prevent a formation of AgCl precipitation.

10. The method of claim 1, wherein the hydrogen producing formulation is made by applying a voltage to an Al metal, a Cu metal, an Ag metal, or a combination thereof.

11. The method of claim 10, wherein the voltage is no less than 1.1V.

* * * * *